United States Patent [19]
Vaghela et al.

[11] Patent Number: 5,968,582
[45] Date of Patent: Oct. 19, 1999

[54] MOLDED FROZEN BAR

[75] Inventors: Madansinh Vaghela, Marysville; Tawfik Yousef Sharkasi, Dublin, both of Ohio

[73] Assignee: Nestec S.A., Vevey, Switzerland

[21] Appl. No.: 09/027,825

[22] Filed: Feb. 20, 1998

[51] Int. Cl.$^6$ ................................ A23G 9/00; A23P 1/00
[52] U.S. Cl. .................. 426/565; 426/566; 426/587; 426/588; 426/515; 426/519; 426/524
[58] Field of Search ..................... 426/565, 566, 426/587, 588, 519, 515, 524

[56] References Cited

U.S. PATENT DOCUMENTS

| | | | |
|---|---|---|---|
| 4,724,153 | 2/1988 | Dublin et al. | 426/565 |
| 4,795,650 | 1/1989 | Groobert | 426/306 |
| 4,828,866 | 5/1989 | Wade et al. | 426/599 |
| 5,112,626 | 5/1992 | Huang et al. | 426/43 |
| 5,171,062 | 12/1992 | Martin et al. | 426/567 |
| 5,175,013 | 12/1992 | Huang et al. | 426/565 |
| 5,292,030 | 3/1994 | Kateman et al. | 62/74 |
| 5,343,710 | 9/1994 | Cathenaut et al. | 62/71 |
| 5,758,571 | 6/1998 | Kateman et al. | 99/455 |

*Primary Examiner*—Nina Bhat
*Attorney, Agent, or Firm*—Pennie & Edmonds LLP

[57] ABSTRACT

A process for the production of a molded aerated frozen bar which comprises preparing a mix of ingredients suitable for a frozen aerated bar, whipping the mix to obtain an aerated mix having an overrun of from 100 to 250%, molding the aerated mix to give a molded aerated mix and freezing the molded aerated mix.

16 Claims, 1 Drawing Sheet

MOLDED FROZEN BAR

FIELD OF THE INVENTION

The present invention relates to a method of preparation of a molded aerated frozen bar and to a molded aerated frozen bar obtainable thereby.

BACKGROUND OF THE INVENTION

Traditionally, molded aerated frozen bars are manufactured by partially freezing the ice cream mix, water ice mix or fruit juice mix in conventional batch or continuous ice cream freezers followed by pumping and filling into molds of different shapes and sizes. During the last decade, a new generation of freezers has been developed which are equipped with pre-whippers enabling the mix to be pre-aerated before being partially frozen in the freezer. The molded products are usually quiescently frozen using a cold brine system at –30° to –40° C. If desired, after demoulding, the molded products may be coated with chocolate or compound coating. Finally, the products are usually packaged and stored at about –20° C. until transport and distribution.

This traditional process of manufacturing molded aerated frozen bars has some limitations. For example, the partial freezing of the mix in the freezer, followed by quiescent freezing in the molds, leads to the formation of an icy texture, loss of air, as well as formation of large air cells in the product having a size range of about 110–185 microns (Arbuckle, W. S. Ice Cream, Fourth Edition, 1986. Van Nostrand Reinhold, New York, p234). In addition, shrinkage of the products often becomes an issue. Moreover, when eating the product, a very cold feeling in the mouth is experienced. Furthermore, it is difficult to achieve more than 80% overrun and almost impossible to achieve an overrun of 120% or higher in the finished products using conventional manufacturing. Currently, there is no process that can produce very finely aerated molded frozen bars (having an average air cell size of less than 50 microns) that are smooth in texture, do not suffer from shrinkage, do not give a very cold feeling in the mouth, have a uniform appearance without large air pockets on the surface, as well as having an overrun of 100 to 250%.

SUMMARY OF THE INVENTION

We have now found that, by using a new process wherein an aged mix is aerated finely in a whipper, e.g. an Oakes commercial whipper, to a desired overrun followed by direct depositing of the aerated mass into molds, and thus eliminating the partial freezing step, the molded frozen product has a fine aerated texture, an unconventionally high overrun of 100 to 250%, is resistant to shrinkage, has a smooth uniform air pocket free appearance, and has a warm eating quality.

Accordingly, the present invention provides a process for the production of a molded aerated frozen bar which comprises preparing a mix of ingredients suitable for a frozen aerated bar, whipping the mix to obtain an aerated mix having an overrun of from 100 to 250%, molding the aerated mix to give a molded aerated mix and freezing the molded aerated mix.

DETAILED DESCRIPTION Of THE INVENTION

The mix suitable for a frozen bar may be any conventional mix such as an ice cream nix, a water ice mix, a fruit juice mix or a sherbet mix. An ice cream mix may contain fat, non-fat milk solids, carbohydrate, a stabiliser together with water and, if desired, other conventional ingredients such as emulsifiers, mineral salts, colorants, etc. A water ice mix is made of fruit juice, sugar, and stabilizer, with or without flavouring, colour or water. A fruit juice mix is similar to a water ice mix except that additional fruit juice is added. A sherbet mix contains fruit juices, sugar, stabilizer and small amounts of milkfat and non-fat milk solids.

For example, an ice cream mix may contain fat in an amount of from 3 to 18% by weight based on the total weight of the mix, non-fat milk solids in an amount of from 8 to 15% by weight based on the total weight of the mix, sugar in an amount of from 10 to 15% by weight based on the total weight of the mix, a corn sweetener in an amount of from 3 to 8% by weight based on the total weight of the mix and a stabilizer in an amount of from 0.1 to 1.0% by weight based on the total weight of the mix.

The fat used may be a dairy or non-dairy fat. When the fat is a dairy fat, it may be for instance, any milk fat source such as butter oil or real cream. When the fat is a non-dairy fat it may be, for instance, an edible oil or fat, preferably a vegetable oil such as coconut oil, palm kernel oil, peanut oil, olive oil, or soy bean oil, etc.

The sugar used may be sucrose, glucose, fructose, lactose, dextrose or invert sugar either in the form of crystalline or liquid syrup.

The corn sweetener may be the crystalline forms of refined corn sugar (dextrose and fructose), dried corn syrup (corn syrup solids), liquid corn syrup or maltodextrins.

The stabilizer may be, for instance, a hydrocolloid such as agar, gelatin, gum acacia, guar gum, gum tragacanth, carrageenan and its salts, carboxymethyl cellulose, sodium alginate or propylene glycol alginate, or any mixture of stabilizers. Advantageously one or more emulsifiers may be present also.

The preparation of the mix of ingredients may be carried out conventionally, by combining the ingredients with shear mixing to disperse and solubilise them into a homogeneous mass, preheating, e.g. to a temperature of from about 62° to 75° C., homogenizing, e.g. in a two stage homogenizer at a pressure of from about 500 to 3500 psig in the first stage and from 0 to 1000 psig in the second stage, more usually from 1000 to 3000 psig in the first stage and from 100 to 800 psig in the second stage, followed by pasteurizing the homogenized mass using, for instance either HTST or LTLT processing.

After pasteurization, the mix is preferably aged by allowing to stand at a temperature of from 0° to 6° C., preferably from 1° to 5° C. for from 1 to 24 hours, more usually from 2 to 18 hours and preferably from 4 to 12 hours.

The mix is then flavoured as needed, aerated in a mixer, e.g. an Oakes Mixer at a temperature of from 0° to 12° C., preferably from 1 to 5° C., and with a back pressure of about 30 to 80 psig, preferably from 40 to 60 psig, to the desired overrun. Preferably the overrun is from 120 to 150% and especially from 125 to 140%.

The aerated mix is then fed, preferably directly, to a mold, e.g. by pumping, and then allowed to freeze to give the frozen molded bar. The freezing may be allowed to take place quiescently at a temperature of from, for example, –25° to –45° C., preferably from –30° to –40° C., conveniently using cold brine.

The frozen molded bar may afterwards be demolded and then packaged and stored at a freezing temperature, usually at –25° C. to –35° C., preferably about –30° C. If desired, after demolding, the frozen molded bar may be coated, for instance with chocolate or compound coating, and then packaged and stored at a freezing temperature.

The frozen molded bar produced by the process of the present invention has the warm eating quality of an extruded product, it has a smooth, uniform, homogeneous texture and appearance, with small air cells of an average size of less than 50 microns uniformly distributed substantially none of which are visible to the naked eye. The molded frozen bar has a quick melt with substantially no lingering of product in the mouth, the ice crystals have a unique thin and substantially curved rod like shape and an average size of less than ice crystals in a conventionally molded aerated ice cream bar after heat shock, and have improved heat shock and shrinkage resistance.

The present invention also provides a molded frozen bar having an overrun of from 100 to 250% with small air cells uniformly distributed substantially none of which are visible to the naked eye.

EXAMPLES

The following Example and accompanying drawings further illustrate the present invention.

Example 1

An ice cream mix is prepared from 8% partially hydrogenated palm kernel oil, 11% non-fat milk solids, 12% sucrose, 6% corn syrup solids (36DE) and 0.5% of a stabilizer blend containing combinations of hydrocolloids such as guar, locust bean gum, carrageenan, carboxymethyl cellulose, etc together with emulsifiers. The ingredients are mixed with agitation to disperse and solubilise them into a homogeneous mass, homogenized with a two stage homogenizer at 2000 psig pressure at the first stage and 500 psig pressure at the second stage, followed by HTST pasteurization.

After pasteurization, the mix is aged by refrigerated storage at a temperature of 4° C. for 6 hours.

The aged mix is then aerated in an Oakes Mixer at a temperature of 4° C. to an overrun of 130%.

The aerated mix is then pumped to a mold and then allowed to freeze to give the frozen molded bar. The freezing is allowed to take place quiescently at a temperature of –40° C. using cold brine.

Figure 1:
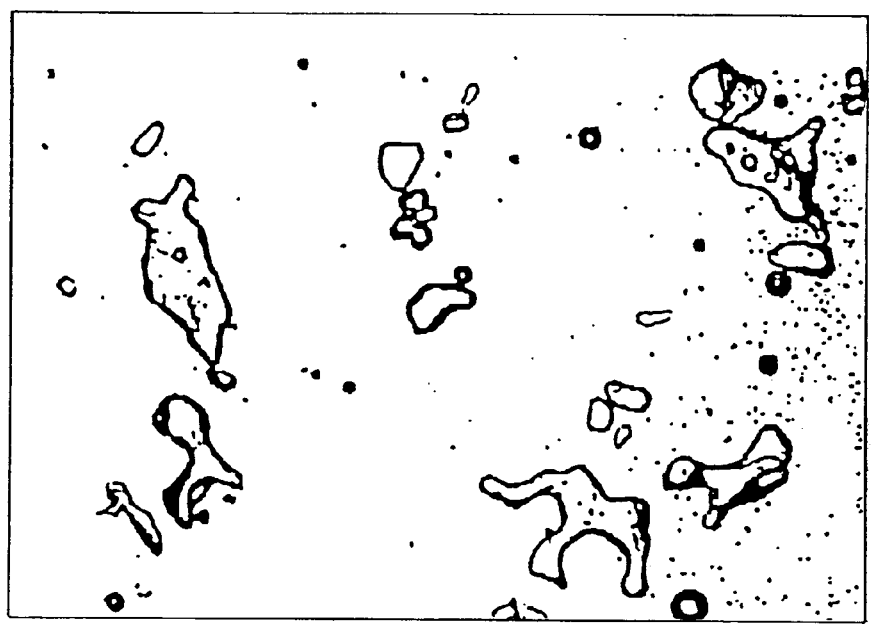
FIG. 1 illustrates ice crystals in a conventionally molded aerated ice cream bar after heat shock.
Figure 2:
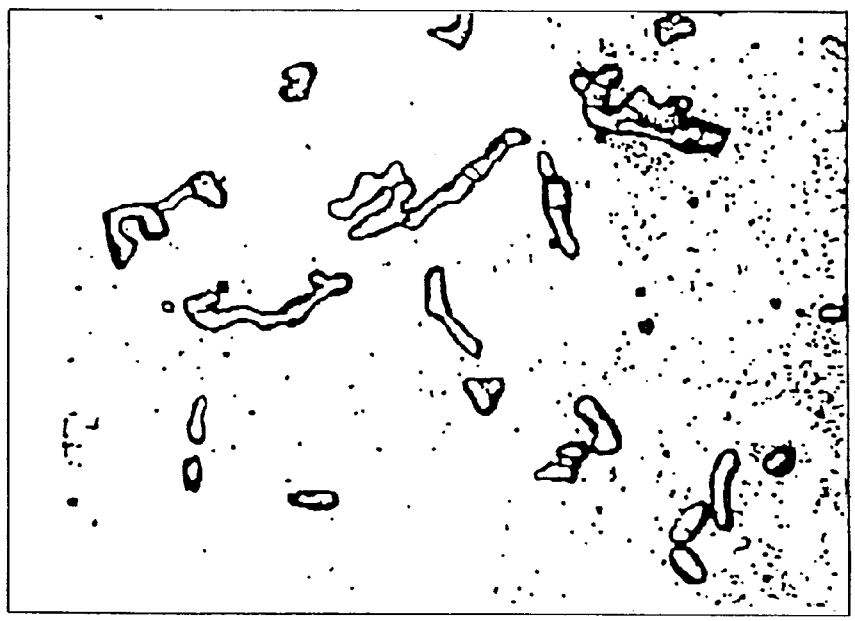
FIG. 2 illustrates ice crystals in a molded aerated ice cream bar made by the process of the present invention after heat shock.

The frozen molded bar produced by the process of the present invention may have the warm eating quality of an extruded product, a smooth, uniform, homogeneous texture and appearance, with small air cells of an average size of less than 50 microns uniformly distributed substantially none of which are visible to the naked eye. The molded frozen bar may have a quick melt with substantially no lingering of product in the mouth, the ice crystals have a unique thin and substantially curved rod like shape and an average size of less than ice crystals in a conventionally molded aerated ice cream bar after heat shock, and have improved heat shock and shrinkage resistance. In the accompanying drawings, FIG. 1 illustrates ice crystals in a conventionally molded aerated ice cream bar after heat shock and FIG. 2 illustrates ice crystals in a molded aerated ice cream bar made by the process of the present invention after heat shock.

The frozen molded bar is demolded and then coated with chocolate crunch bar at 35° C., packaged and stored at –20° C.

We claim:

1. A process for the production of a molded aerated frozen bar which comprises preparing a mix of ingredients suitable for a frozen aerated bar, whipping the mix to obtain an aerated mix having an overrun of from 100% to 250%, molding the aerated mix to give a molded aerated mix and freezing the molded aerated mix to produce a molded aerated frozen bar which includes uniformly distributed small air cells having an average size of less than 50 microns.

2. A process according to claim 1 wherein the mix suitable for the frozen bar is an ice cream mix, a water ice mix, a fit juice mix or a sherbet mix.

3. A process according to claim 1 wherein the preparation of the mix of ingredients is carried out by combining the ingredients with shear mixing to disperse and solubilise them into a homogeneous mass, homogenizing in a two stage homogenizer at a pressure of from about 500 to 3500 psig in the first stage and from 0 to 1000 psig in the second stage, followed by pasteurizing the homogenized mass.

4. A process according to claim 3 wherein, after pasteurization, the mix is aged by refrigerated storage at a temperature of from 0° to 6° C. for from 1 to 24 hours.

5. A process according to claim 1 wherein the mix is aerated in a mixer at a temperature of from 0° to 12° C. to the desired overrun.

6. A process according to claim 1 wherein the aerated mix is directly fed to a mold, and then allowed to freeze to give the frozen molded bar.

7. A process according to claim 1 wherein the freezing is allowed to take place quiescently at a temperature of from –25° to –45° C.

8. A process according to claim 1 wherein the molded aerated frozen bar is afterwards demolded and then packaged and stored at a freezing temperature.

9. A process according to claim 1 wherein the molded aerated frozen bar is afterwards demolded and then coated and then packaged and stored at a freezing temperature.

10. A process according to either claim 8 or claim 9 wherein the freezing temperature is from –25° to –35° C.

11. A process according to claim 1, wherein the overrun is at least 130%.

12. A molded aerated frozen bar having an overrun of from 100 to 250% with small air cells having an average size of less than 50 microns uniformly distributed substantially none of which are visible to the naked eye.

13. A molded aerated frozen bar according to claim 12 having a smooth texture similar to an extruded bar, warm eating quality and quick melt with substantially no lingering of product in the mouth.

14. A molded aerated frozen bar according to claim 12, wherein the overrun is at least 130%.

15. A molded aerated frozen bar according to claim 12, wherein the overrun is at least 130%.

16. A molded aerated frozen bar comprising a prepared mix of ingredients suitable for a frozen aerated bar and a gum in an amount sufficient to stabilize the bar, the bar having an overrun of between about 100% to about 250%, uniformly distributed small air cells having an average size of less than about 50 microns, a smooth texture similar to an extruded bar, a warm eating quality, and a quick melt with substantially no lingering of product in the mouth.

* * * * *